(12) United States Patent
Chadwick, Jr. et al.

(10) Patent No.: US 8,667,223 B2
(45) Date of Patent: Mar. 4, 2014

(54) SHADOW REGISTERS FOR LEAST RECENTLY USED DATA IN CACHE

(75) Inventors: Thomas B. Chadwick, Jr., Essesx Junction, VT (US); Robert D. Herzl, South Burlington, VT (US); Kenneth A. Lauricella, Colchester, VT (US); Arnold S. Tran, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 13/207,817

(22) Filed: Aug. 11, 2011

(65) Prior Publication Data

US 2013/0042068 A1   Feb. 14, 2013

(51) Int. Cl.
*G06F 12/12*   (2006.01)
(52) U.S. Cl.
USPC ............................. 711/136; 711/133; 711/140
(58) Field of Classification Search
None
See application file for complete search history.

(56) References Cited

U.S. PATENT DOCUMENTS

| 5,809,530 | A | | 9/1998 | Samra et al. | |
|---|---|---|---|---|---|
| 6,078,995 | A | * | 6/2000 | Bewick et al. | 711/136 |
| 6,161,167 | A | * | 12/2000 | Witt | 711/136 |
| 8,108,614 | B2 | * | 1/2012 | Sprangle et al. | 711/134 |
| 2005/0060494 | A1 | * | 3/2005 | Desai et al. | 711/118 |
| 2008/0034161 | A1 | * | 2/2008 | Savell | 711/118 |

\* cited by examiner

*Primary Examiner* — Gary Portka
(74) *Attorney, Agent, or Firm* — Cantor Colburn LLP; Michael LeStrange

(57) ABSTRACT

A cache for use in a central processing unit (CPU) of a computer includes a data array; a tag array configured to hold a list of addresses corresponding to each data entry held in the data array; a least recently used (LRU) array configured to hold data indicating least recently used data entries in the data array; a line fill buffer configured to receive data from an address in main memory that is located external to the cache in the event of a cache miss; and a shadow register associated with the line fill buffer, wherein the shadow register is configured to hold LRU data indicating a current state of the LRU array.

12 Claims, 3 Drawing Sheets

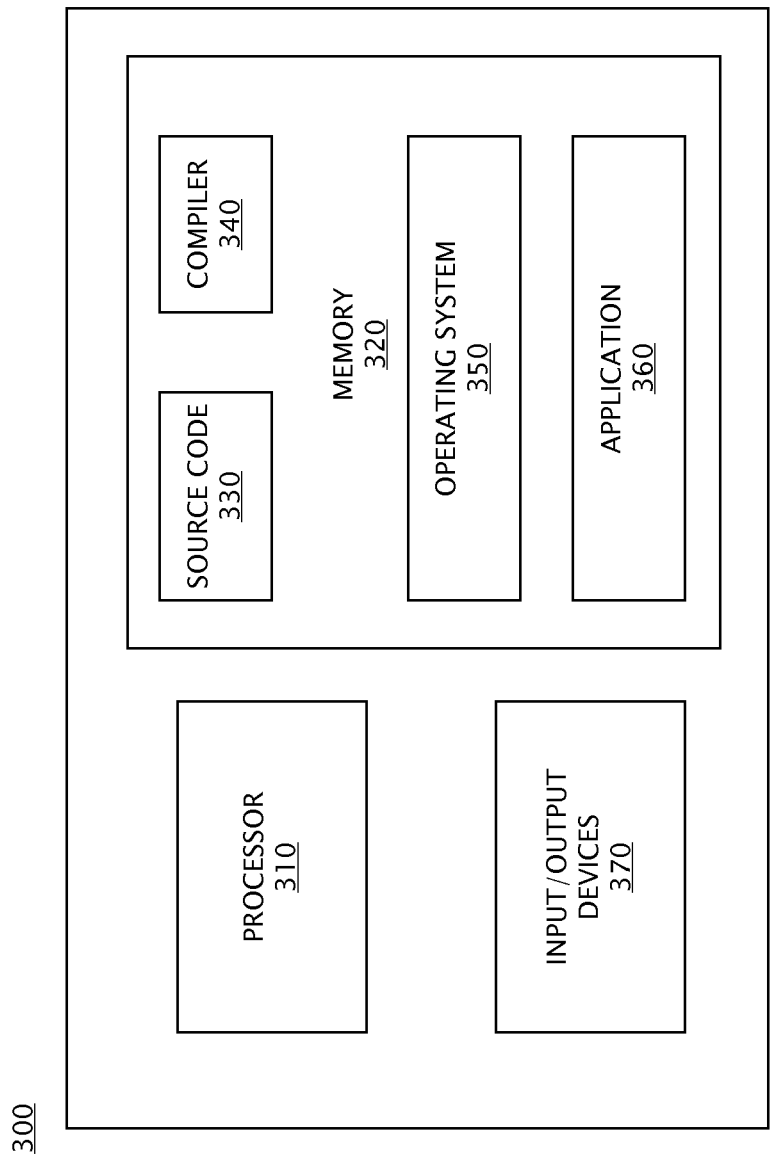

SHADOW REGISTERS FOR LEAST RECENTLY USED DATA IN CACHE

BACKGROUND

This disclosure relates generally to the field of computer hardware, particularly to a cache in a processor of a computer, and more particularly to shadow registers for storage of least recently used (LRU) data in a cache.

Processor performance has been increasing rapidly from year to year, while memory access times have been improving more slowly. As a result, the latency of cache misses in processor cycles is increasing rapidly. Additionally, due to the increase in the required data bandwidth to support higher degrees of instruction-level parallelism, cache miss latencies are becoming a larger fraction of overall processor performance. Therefore, various attempts have been made to reduce and tolerate cache miss latency.

The cache is used by the central processing unit (CPU) of a computer system to reduce the average time to access memory. The cache is a relatively small, fast memory local to the CPU that stores copies of data from the most frequently accessed main memory locations. A CPU may include various types of local caches, such as an instruction cache and a data cache, and may also include various levels of caches, such as a level-2 (L2) cache and a level-3 (L3) cache. As long as most memory accesses are made within the cache, the average latency of memory accesses will be closer to the cache latency than to the latency of the main memory. A cache may include three local memory arrays: a tag array, a least recently used (LRU, or LRU/Valid) array, and a data array. When the CPU needs to read from or write to a memory address in the main memory, the CPU first checks whether an entry corresponding to a copy of the data from the address in the main memory is currently held in the data array of the cache by checking the tag array, and simultaneously checks the LRU array. If there is a cache hit, and the processor immediately reads from or writes to the entry corresponding to the requested address in the data array, which is faster than reading from or writing to the main memory. The LRU array is also updated simultaneously with the data array read/write. The cache therefore speeds up fetches by avoiding accessing the memory external to the cache.

In the event of a cache miss, in which an entry corresponding to a copy of the data from the address in the main memory is not currently held in the data array of the cache, the CPU must locate the address in the main memory of the computing system. This may be a relatively slow process. When the data is retrieved from the address in the main memory, the data is written into temporary storage, referred to as a line fill buffer, until the cache is ready to receive the retrieved data into the data array and update the tag and LRU arrays. The LRU array, which keeps a record of which entry in the data array is the least recently used so that it may be overwritten with the newly retrieved data, is checked again to determine which entry in the data array to overwrite before writing the contents of the line fill buffer into the data array, and simultaneously updating the tag and LRU arrays. However, checking the LRU unit a second time after retrieving the data from the address in main memory requires an additional array access cycle, which increases the total time needed to process a cache miss.

BRIEF SUMMARY

In one aspect, a cache for use in a central processing unit (CPU) of a computer includes a data array; a tag array configured to hold a list of addresses corresponding to each data entry held in the data array; a least recently used (LRU) array configured to hold data indicating least recently used data entries in the data array; a line fill buffer configured to receive data from an address in main memory that is located external to the cache in the event of a cache miss; and a shadow register associated with the line fill buffer, wherein the shadow register is configured to hold LRU data indicating a current state of the LRU array.

In another aspect, a method of operating a cache of a central processing unit (CPU) of a computing system, the cache comprising a data array, a tag array configured to hold a list of addresses corresponding to each data entry held in the data array, and a least recently used (LRU) array configured to hold data indicating least recently used data entries in the data array, includes in the event an address received on an input of the cache is determined to be a cache miss: storing LRU data in a shadow register, the shadow register being associated with a line fill buffer, wherein the LRU data indicates a current state of the LRU array; requesting data from the address in a main memory located external to the cache; and when the data is received from the address in the main memory, writing the data from the main memory into the line fill buffer.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 3 illustrates a computer that may be used in conjunction with a cache including shadow registers for LRU data.

DETAILED DESCRIPTION

Embodiments of shadow registers for storage of LRU data for a cache, and methods of operating a cache with shadow registers for LRU data, are provided, with exemplary embodiments being discussed below in detail. To avoid checking the LRU array a second time after receipt of data from main memory to a line fill buffer, and before writing data from a line fill buffer to the data array of the cache, shadow registers associated with the line fill buffers that reflect the current LRU state are maintained. Therefore, only one array access cycle is needed to perform the write from the line fill buffer to the data array, as the contents of the line fill buffer are directly written into the memory location in the data array indicated by the line fill buffer's associated shadow register. The shadow registers also maintain data for updating the LRU array simultaneously with the data and tag array write. The various cache arrays are then available for new fetch or store requests after a single array access cycle, thereby improving the computing system performance by reducing the trailing edge impact of cache performance due to cache reloads.

Each line fill buffer in the cache may have a respective associated shadow register. The shadow registers are managed in parallel to the LRU array by replacement logic that is internal to the cache. The shadow registers are maintained to reflect the current contents of the LRU array. At the time of any cache access when the tag and LRU arrays are initially read, if a cache miss is detected, the LRU data for the entry in the data array that will be overwritten with the data from the main memory is loaded into a shadow register by the replacement logic. After the shadow register is loaded with LRU data, it is updated any time the corresponding entry in the LRU array is updated until the data is ready to be written from the line fill buffer into the data array. Therefore, the shadow register contains the latest status of the entry in the LRU array when the time comes to write the data from the line fill buffer into the data array. When the data for the cache miss is returned from the main memory to the line fill buffer associated with the shadow register, the cache control logic requests a reload. When the reload request is granted, the contents of the shadow register are used to generate new LRU data to be written into the LRU array. Since the shadow register contains the most recent state of the LRU array, the LRU array need not be read before the data array write, and tag array and LRU updates, are performed. The cache control logic uses the shadow register LRU data to make the decision of which entry in the data array to overwrite, and new LRU data for the LRU array is generated from the shadow register data to be written into the LRU array. Only a single array access cycle by the cache control logic is required to perform the write from the line fill buffer into the data array.

Figure 1:
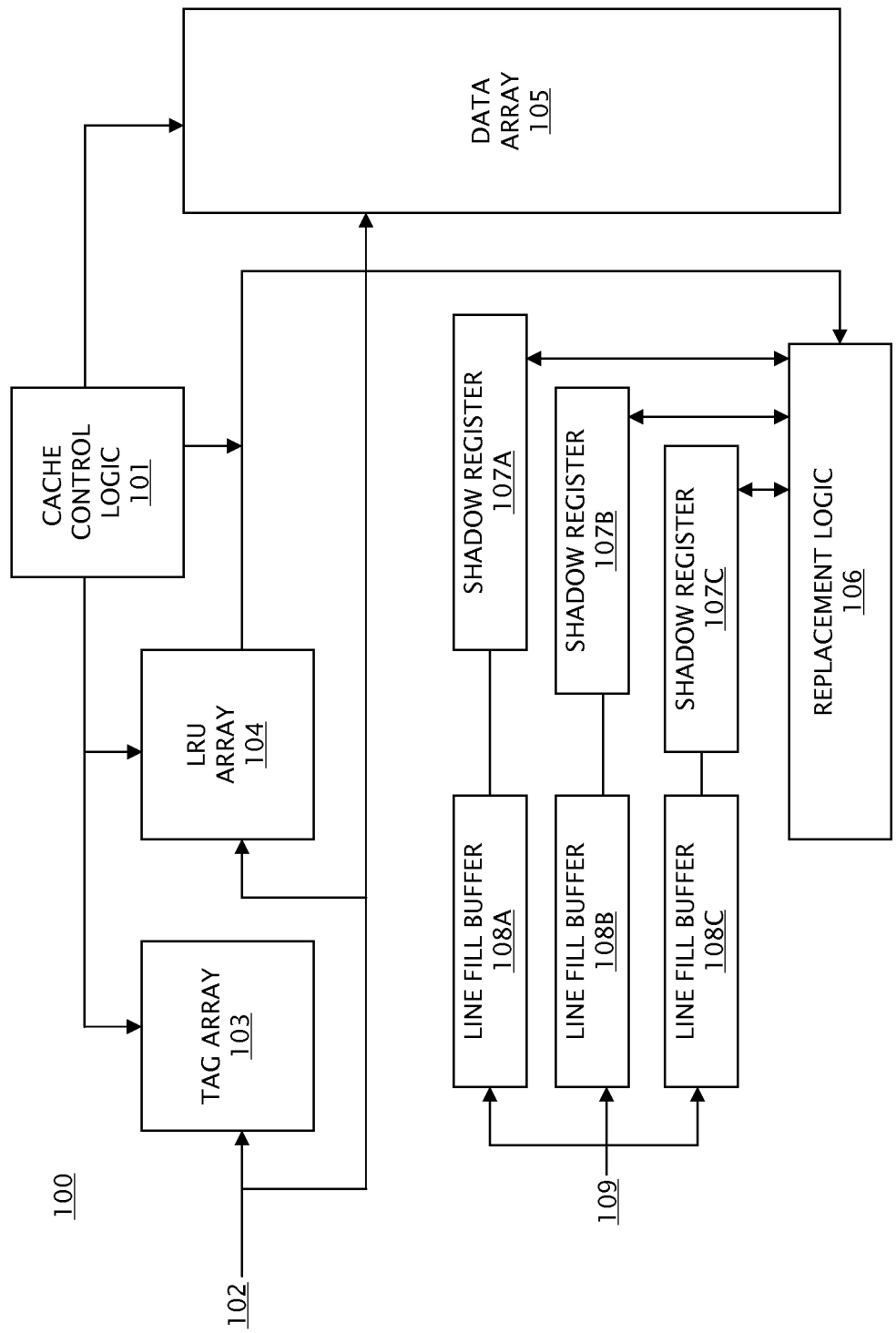
FIG. 1 is a schematic block diagram illustrating an embodiment of a cache including shadow registers for LRU data.

FIG. 1 illustrates an embodiment of a cache 100 including shadow registers 107A-C for LRU data. Cache 100 may be any type of cache that includes a tag/LUR/data array architecture, including but not limited to an instruction cache or a data cache, and may be an L2 or L3 cache in various embodiments. In The cache 100 is controlled by cache control logic 101, and includes local memory including tag array 103, LRU array 104, and data array 105. The tag array 103, LRU array 104, and data array 105 each contain the same number of entries. Tag array 103 holds a list of addresses corresponding to each entry that is held in the data array 105. The LRU array 104 holds data indicating usage for each entry in the data array 105, which determines which entry in the data array 105 was least recently used. The least recently used entry in the data array 105 as indicated by the LRU array 104 may be overwritten. Addresses are received by the cache 100 at input 102. Replacement logic 106 manages shadow registers 107A-C. Each of line fill buffers 108A-C, which receive data from a main memory (not shown) that is external to the cache 100 on input 109, has a respective shadow register 107A-C. Line fill buffers 108A-C and respective shadow registers 107A-C are shown for illustrative purposes only; a cache may include any appropriate number of line fill buffers and respective associated shadow registers. In the event of a cache hit, an address received on input 102 is found in the tag array 103 by cache control logic 101. The cache control logic 101 then performs a read or write of the entry corresponding to the address in the data array 105, and simultaneously updates the LRU array 104.

Figure 2:
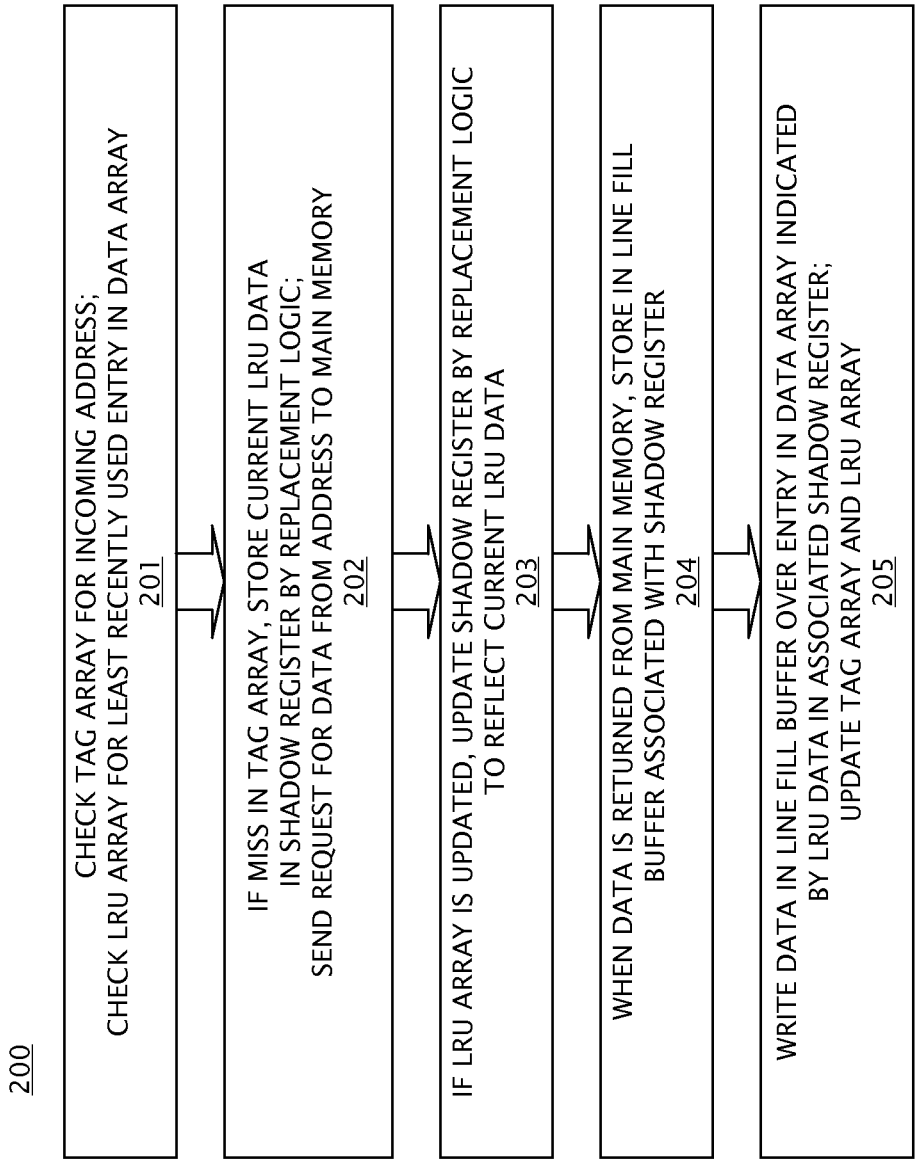
FIG. 2 is a flowchart illustrating an embodiment of a method of operating a cache including shadow registers for LRU data.

FIG. 2 illustrates an embodiment of a flowchart of a method 200 of operating a cache including shadow registers for LRU data. Method 200 is discussed with reference to FIG. 1, and in particular with reference to exemplary shadow register 107A and associated line fill buffer 108A. In block 201 of method 200, an address corresponding to a read or write instruction is received by the cache 100 on input 102, and the tag array 103 is checked by cache control logic 101 to determine if the address is held in the data array 105. The LRU array 104 is checked simultaneously with checking the tag array 103 by cache control logic 101. If there is a cache miss (i.e., the address is not found in the tag array 103) detected in block 201 of method 200, flow proceeds to block 202 of method 200, wherein the current LRU data from LRU array 104 is written into shadow register 107A by replacement logic 106, and a request is issued to a main memory (not shown) that is external to the cache 100 for the data from the address by cache control logic 101. Then, in block 203 of method 200, the cache 100 continues to perform read/writes while the data is being retrieved from the main memory, and the replacement logic 106 updates the shadow register 107A any time the corresponding entry in the LRU array 104 is updated to reflect the current LRU data. Updates to the shadow register 107A to reflect the current LRU state are performed until the data from the main memory is written from the line fill buffer 108A to the data array 105 in block 205 of FIG. 5 (discussed below), so that the shadow register 107A contains the most recent LRU data indicating which entry in the data array 105 to overwrite at the point when it is used to update the data array 105 and LRU array 104. Data may be written to/from other line fill buffers (such as line fill buffers 108B-C) and associated shadow registers (such as shadow registers 107B-C) during blocks 203 and 204 of method 200. Then, in block 204 of method 200, the data from the address in the main memory is received on input 108, and written into line fill buffer 108A. Lastly, in block 205 of method 200, the data from the line fill buffer 108A is written into the data array 105, overwriting the entry in the data array 105 that is indicated by the LRU data in shadow register 107A, by cache control logic 101. The tag array 103 and LRU array 104 are also updated simultaneously with the write to the data array 105; the tag array 103 is updated with the address of the data from the line fill buffer 108A, and the LRU array 104 is updated based on the data from the shadow register 107A. The write from the line fill buffer 108A to the data array 105 therefore only requires a single array access cycle.

FIG. 3 illustrates an example of a computer 300 which may be utilized by exemplary embodiments of shadow registers for LRU data storage for a cache. For example, a cache including shadow registers for LRU data such as is described with respect to FIGS. 1 and 2 may be incorporated into processor 310, and the main memory data may be retrieved from memory 320. Various operations discussed above may utilize the capabilities of the computer 300. One or more of the capabilities of the computer 300 may be incorporated in any element, module, application, and/or component discussed herein.

The computer 300 includes, but is not limited to, PCs, workstations, laptops, PDAs, palm devices, servers, storages, and the like. Generally, in terms of hardware architecture, the computer 300 may include one or more processors 310, memory 320, and one or more input and/or output (I/O) devices 370 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 310 is a hardware device for executing software that can be stored in the memory 320. The processor 310 can be virtually any custom made or commercially available processor, a central processing unit (CPU), a digital signal processor (DSP), or an auxiliary processor among several processors associated with the computer 300, and the processor 310 may be a semiconductor based microprocessor (in the form of a microchip) or a macroprocessor.

The memory 320 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 320 may incorporate electronic, magnetic, optical, and/or other types of storage media. Note that the memory 320 can have a distributed architecture, where various components are situated remote from one another, but can be accessed by the processor 310.

The software in the memory 320 may include one or more separate programs, each of which comprises an ordered listing of executable instructions for implementing logical functions. The software in the memory 320 includes a suitable operating system (O/S) 350, compiler 340, source code 330, and one or more applications 360 in accordance with exemplary embodiments. As illustrated, the application 360 comprises numerous functional components for implementing the features and operations of the exemplary embodiments. The application 360 of the computer 300 may represent various applications, computational units, logic, functional units, processes, operations, virtual entities, and/or modules in accordance with exemplary embodiments, but the application 360 is not meant to be a limitation.

The operating system 350 controls the execution of other computer programs, and provides scheduling, input-output control, file and data management, memory management, and communication control and related services. It is contemplated by the inventors that the application 360 for implementing exemplary embodiments may be applicable on all commercially available operating systems.

Application 360 may be a source program, executable program (object code), script, or any other entity comprising a set of instructions to be performed. When a source program, then the program is usually translated via a compiler (such as the compiler 340), assembler, interpreter, or the like, which may or may not be included within the memory 320, so as to operate properly in connection with the O/S 350. Furthermore, the application 360 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 370 may include input devices such as, for example but not limited to, a mouse, keyboard, scanner, microphone, camera, etc. Furthermore, the I/O devices 370 may also include output devices, for example but not limited to a printer, display, etc. Finally, the I/O devices 370 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 370 also include components for communicating over various networks, such as the Internet or intranet.

If the computer 300 is a PC, workstation, intelligent device or the like, the software in the memory 320 may further include a basic input output system (BIOS) (omitted for simplicity). The BIOS is a set of essential software routines that initialize and test hardware at startup, start the O/S 350, and support the transfer of data among the hardware devices. The BIOS is stored in some type of read-only-memory, such as ROM, PROM, EPROM, EEPROM or the like, so that the BIOS can be executed when the computer 300 is activated.

When the computer 300 is in operation, the processor 310 is configured to execute software stored within the memory 320, to communicate data to and from the memory 320, and to generally control operations of the computer 300 pursuant to the software. The application 360 and the O/S 350 are read, in whole or in part, by the processor 310, perhaps buffered within the processor 310, and then executed.

When the application 360 is implemented in software it should be noted that the application 360 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 360 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 360 is implemented in hardware, the application 360 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include reduction of array access cycles required to reload a cache in the event of a cache miss.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A cache for use in a central processing unit (CPU) of a computer, comprising:
   a data array;
   a tag array configured to hold a list of addresses corresponding to each data entry held in the data array;
   a least recently used (LRU) array configured to hold data indicating least recently used data entries in the data array;
   a line fill buffer configured to receive data corresponding to the cache miss from an address in main memory that is located externally to the cache based on detection of the cache miss;
   a shadow register associated with the line fill buffer, wherein the shadow register is configured to hold LRU data indicating a current state of the LRU array; and
   replacement logic configured to manage the shadow register by:
      writing data indicating the current state of the LRU array into the shadow register based on detection of the cache miss; and
      updating the shadow register to reflect the current state of the LRU array based on the LRU array being updated based on a read or write operation that is performed in the cache after detection of the cache miss, wherein the updating of the shadow register is performed before the data corresponding to the cache miss in the line fill buffer is written into the data array at an entry indicated by the LRU data in the shadow register.

2. The cache of claim 1, wherein the cache comprises a plurality of line fill buffers, and each of the line fill buffers has a respective associated shadow register.

3. The cache of claim 2, wherein each of the shadow registers is managed by the replacement logic.

4. The cache of claim 1, wherein the cache is configured to update the tag array with the address corresponding to the cache miss based on the LRU data in the shadow register simultaneously with writing the data corresponding to the cache miss in the line fill buffer into the data array at the entry indicated by the LRU data in the shadow register.

5. The cache of claim 1, wherein the cache miss occurs based on the address not being located in the tag array.

6. The cache of claim 1, wherein the cache comprises one of an instruction cache, a data cache, a level-2 cache, and a level-3 cache.

7. A method of operating a cache of a central processing unit (CPU) of a computing system, the cache comprising a data array, a tag array configured to hold a list of addresses corresponding to each data entry held in the data array, and a least recently used (LRU) array configured to hold data indicating least recently used data entries in the data array, the method comprising:
   based on an address received on an input of the cache being a cache miss:
      storing LRU data in a shadow register based on detection of the cache miss, the shadow register being associated with a line fill buffer, wherein the LRU data indicates a current state of the LRU array;
      requesting data corresponding to the cache miss from the address in a main memory located externally to the cache;
      based on the data corresponding to the cache miss being received from the address in the main memory, writing the data corresponding to the cache miss into the line fill buffer;
      updating the shadow register to reflect the current state of the LRU array based on the LRU array being updated based on a read or write operation that is performed in the cache after detection of the cache miss, wherein the updating of the shadow register is performed before the data corresponding to the cache miss in the line fill buffer is written into the data array at an entry indicated by the LRU data in the shadow register; and
   writing the data corresponding to the cache miss from the line fill buffer into the data array at an entry indicated by the LRU data in the shadow register.

8. The method of claim 7, wherein the cache further comprises a plurality of line fill buffers, and each of the line fill buffers has a respective associated shadow register.

9. The method of claim 8, wherein each of the shadow registers is managed by the replacement logic.

10. The method of claim 7, further comprising updating the tag array with the address corresponding to the cache miss based on the LRU data in the shadow register simultaneously with writing the data corresponding to the cache miss in the line fill buffer into the data array at the entry indicated by the LRU data in the shadow register.

11. The method of claim 7, wherein the cache miss is determined based on the address not being located in the tag array.

12. The method of claim 7, wherein the cache comprises one of an instruction cache, a data cache, a level-2 cache, and a level-3 cache.

* * * * *